United States Patent
Tanimoto

(10) Patent No.: US 9,344,399 B2
(45) Date of Patent: May 17, 2016

(54) RELAY SERVER AND RELAY COMMUNICATION SYSTEM

(75) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 282 days.

(21) Appl. No.: 14/131,739

(22) PCT Filed: Mar. 6, 2012

(86) PCT No.: PCT/JP2012/001521
§ 371 (c)(1),
(2), (4) Date: Jan. 9, 2014

(87) PCT Pub. No.: WO2013/008358
PCT Pub. Date: Jan. 17, 2013

(65) Prior Publication Data
US 2014/0169373 A1    Jun. 19, 2014

(30) Foreign Application Priority Data
Jul. 11, 2011 (JP) .................................. 2011-153246

(51) Int. Cl.
*H04L 12/28* (2006.01)
*H04L 29/12* (2006.01)
*H04L 12/751* (2013.01)
*H04L 29/06* (2006.01)
*H04L 12/741* (2013.01)

(52) U.S. Cl.
CPC ............ *H04L 61/2535* (2013.01); *H04L 45/02* (2013.01); *H04L 45/74* (2013.01); *H04L 63/0272* (2013.01); *H04L 61/2007* (2013.01)

(58) Field of Classification Search
USPC .............................. 370/392, 395.53, 253, 252
See application file for complete search history.

(56) References Cited

U.S. PATENT DOCUMENTS

| 7,107,614 B1 | 9/2006 | Boden et al. |
| 2007/0127461 A1* | 6/2007 | Yamada ............ H04L 29/12028 370/389 |
| 2011/0161525 A1 | 6/2011 | Tanimoto |

(Continued)

FOREIGN PATENT DOCUMENTS

| CN | 101567831 A | 10/2009 | |
| JP | 2010-268312 A | 11/2010 | |
| KR | EP 1441483 A2 * | 7/2004 | .......... H04L 12/4633 |

OTHER PUBLICATIONS

Official Communication issued in corresponding European Patent Application No. 12810944.4, mailed on Apr. 22, 2015.

(Continued)

*Primary Examiner* — Zewdu A Beyen
(74) *Attorney, Agent, or Firm* — Keating & Bennett, LLP

(57) ABSTRACT

A relay server stores a routing apparatus belonging to a VPN group to which the relay server itself belongs, a second routing object address that is an address of the routing apparatus, and the like. The relay server stores a relationship of assignment of a virtual address to the second routing object address. The virtual address is an address that does not overlap with addresses of any other apparatuses. The relay server, upon receipt of a packet from a routing session, converts a source of the packet from an actual address into the virtual address and forwards the packet to a routing object device of the relay server itself. The relay server, upon receipt of a packet from the routing object device of the relay server itself, converts a destination of the packet from the virtual address into an actual address and forwards the packet to the routing session.

5 Claims, 13 Drawing Sheets

(56) References Cited

U.S. PATENT DOCUMENTS

2012/0057602 A1 3/2012 Tanimoto
2012/0271912 A1* 10/2012 Cho .................... H04L 61/2015
　　　　　　　　　　　　　　　　　　　　　709/217

OTHER PUBLICATIONS

Official Communication issued in International Patent Application No. PCT/JP2012/001521, mailed on Apr. 3, 2012.

* cited by examiner

```
<?xml version="1.0" encoding="UTF-8" ?>
-<root>
    -<group id="group-a@relaysystem.net"
        lastmod="20090402133100" name="GROUP A">        } 511
        <site id="server1@relaysystem.net" rel="allow"/>  ⎱
        <site id="server2@relaysystem.net" rel="allow"/>  ⎬ 512
        <site id="server3@relaysystem.net" rel="allow"/>  ⎰
    </group>
</root>
```

Fig.4

```
<?xml version="1.0" encoding="UTF-8" ?>
-<root>
   -<site id="server1@relaysystem.net"
      name="RELAY SERVER 1" stat="active">                    } 521
      -<node  group="group-a@relaysystem.net"
         id="client13@server1.net"                             } 522
         name="CLIENT 13" site="server1@relaysystem.net"/>
   </site>
   -<site id="server2@relaysystem.net"
      name="RELAY SERVER 2" stat="active">                    } 521
      -<node  group="group-a@relaysystem.net"
         id="client22@server2.net"                             } 522
         name="CLIENT 22" site="server2@relaysystem.net"/>
   </site>
   -<site id="server3@relaysystem.net"
      name="RELAY SERVER 3" stat="active">                    } 521
      -<node  group="group-a@relaysystem.net"
         id="client34@server3.net"                             } 522
         name="CLIENT 34" site="server3@relaysystem.net"/>
   </site>
</root>
```

Fig. 5A
```
<?xml version="1.0" encoding="UTF-8" ?>
-<root>
  -<node addr="200.1.40.30"
      group="group-a@relaysystem.net"
      id="client13@server1.net"
      name="CLIENT 13" pass="abc" port="5070">
    </node>
  </root>
```

Fig. 5B
```
<?xml version="1.0" encoding="UTF-8" ?>
-<root>
  -<node addr="172.158.0.20"
      group="group-a@relaysystem.net"
      id="client22@server2.net"
      name="CLIENT 22" pass="abc" port="5070">
    </node>
  </root>
```

Fig. 5C
```
<?xml version="1.0" encoding="UTF-8" ?>
-<root>
  -<node addr="192.168.0.40"
      group="group-a@relaysystem.net"
      id="client34@server3.net"
      name="CLIENT 34" pass="abc" port="5070">
    </node>
  </root>
```

Fig.6
```
<?xml version="1.0" encoding="UTF-8"?>
-<root>
   -<vnet group="group-a@relaysystem.net"          ⎤
       id="vpn-group-1@relaysystem.net"            ⎬ 541
       lastmod="20090410162500" name="VPN-GROUP 1"> ⎦
     <rp id="server1@relaysystem.net"/>            ⎤ 542
     <rp id="server3@relaysystem.net"/>            ⎦
     <ssn sp="server3@relaysystem.net"             ⎤ 543
       ep="server1@relaysystem.net"/>              ⎦
   </vnet>
 </root>
```

Fig. 7A

| ADDRESS FILTER INFORMATION | |
|---|---|
| ROUTING OBJECT ADDRESS | NAME |
| 200.1.40.10 | OPERATION PC 11 |
| 200.1.40.20 | OPERATION PC 12 |

Fig. 7B

| ADDRESS FILTER INFORMATION | |
|---|---|
| ROUTING OBJECT ADDRESS | NAME |
| 172.158.0.10 | OPERATION PC 21 |

Fig. 7C

| ADDRESS FILTER INFORMATION | |
|---|---|
| ROUTING OBJECT ADDRESS | NAME |
| 192.168.0.10 | OBJECT TERMINAL 31 |
| 192.168.0.20 | OBJECT TERMINAL 32 |
| 192.168.0.30 | OBJECT TERMINAL 33 |

Fig. 8

| TERMINAL ID OF ROUTING APPARATUS | ADDRESS FILTER INFORMATION | |
|---|---|---|
| | ROUTING OBJECT ADDRESS | NAME |
| server1@relaysystem.net | 200.1.40.10 | OPERATION PC 11 |
| | 200.1.40.20 | OPERATION PC 12 |
| server3@relaysystem.net | 192.168.0.10 | OBJECT TERMINAL 31 |
| | 192.168.0.20 | OBJECT TERMINAL 32 |
| | 192.168.0.30 | OBJECT TERMINAL 33 |

SECOND ROUTING OBJECT ADDRESS

FIRST ROUTING OBJECT ADDRESS

Fig.9

| VIRTUAL ADDRESS REGISTRATION INFORMATION |
|---|
| 150.100.10.0/24 |
| 150.100.11.0/24 |

| VIRTUAL ADDRESS ASSIGNMENT INFORMATION | | |
|---|---|---|
| NAME | ACTUAL ADDRESS | VIRTUAL ADDRESS |
| OPERATION PC 11 | 200.1.40.10 | 150.100.10.1 |
| OPERATION PC 12 | 200.1.40.20 | 150.100.10.2 |

| GATEWAY TABLE | |
|---|---|
| DESTINATION ADDRESS OF PACKET | GATEWAY |
| 150.100.10.0/24 | RELAY SERVER 3 (192.168.0.1) |
| 150.100.11.0/24 | |
| OTHERS | ROUTER 35 (192.168.0.50) |

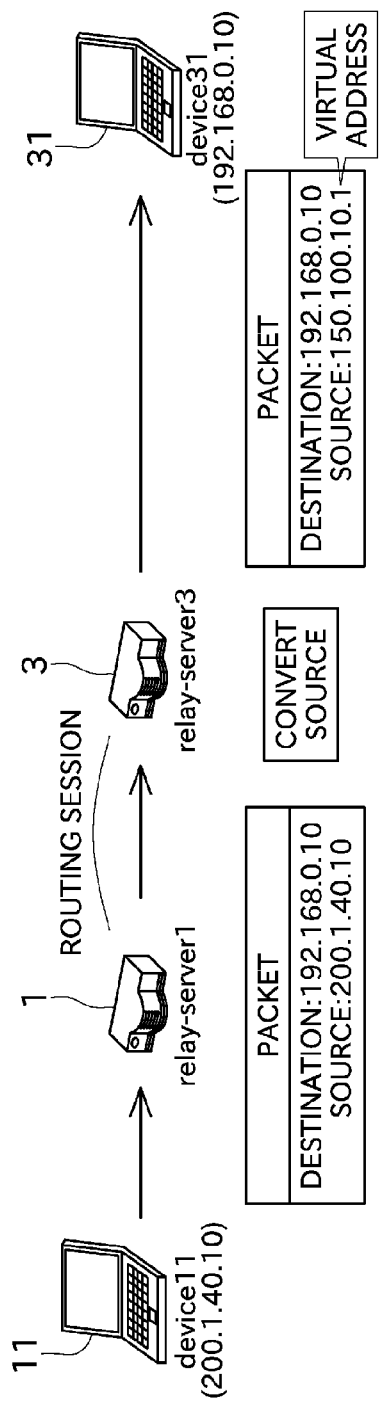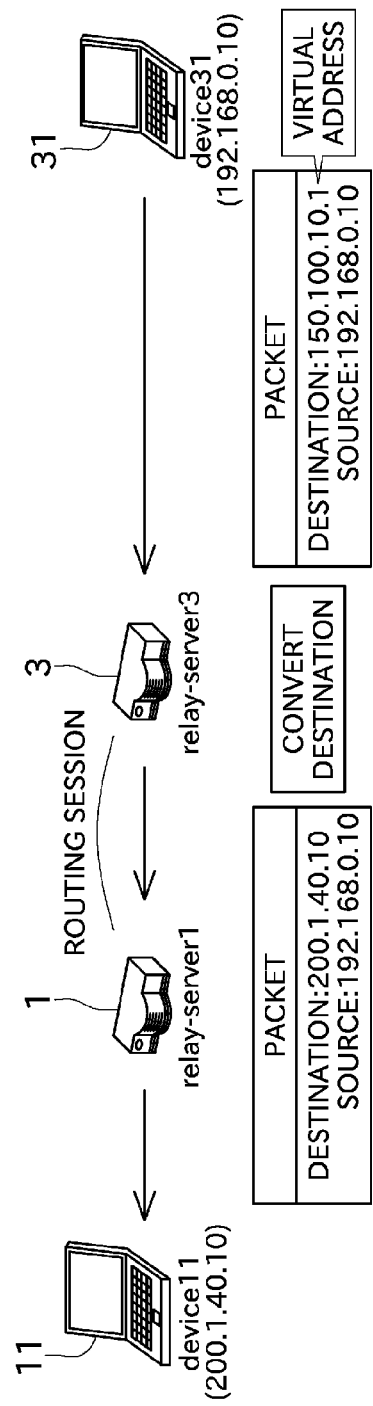

Fig.18

| VIRTUAL ADDRESS MANAGEMENT INFORMATION | | |
|---|---|---|
| NAME | ADDRESS USED | VIRTUAL ADDRESS ASSIGNMENT IN CASE OF SESSION DISCONNECTION |
| RELAY SERVER 1 | VIRTUAL ADDRESS | DE-ASSIGN |
| RELAY SERVER 2 | VIRTUAL ADDRESS | MAINTAIN |
| RELAY SERVER 4 | ACTUAL ADDRESS | — |

RELAY SERVER AND RELAY COMMUNICATION SYSTEM

BACKGROUND OF THE INVENTION

1. Field of the Invention

The present invention relates mainly to a relay server that enables communication to be performed between apparatuses connected to different LANs (Local Area Networks).

2. Description of the Related Art

Conventionally, a communication technology called a virtual private network (Virtual Private Network, VPN) has been known, which allows communication to be performed between LANs installed in physically distant places. Japanese Patent Application Laid-Open No. 2010-268312 shows an example in which a relay server, a communication terminal, and the like, are connected to each of a plurality of LANs installed in physically distant places. With use of the VPN, a communication terminal is able to transmit a packet to a communication terminal connected to another LAN. More specifically, a packet transmitted by a communication terminal is firstly sent to a relay server belonging to a LAN that the communication terminal belongs to. This relay server transmits (forwards) the packet, via Internet, to a relay server belonging to a LAN that a destination communication terminal belongs to. The relay server receives the packet, and transmits (forwards) the packet to the destination communication terminal.

Use of the VPN enables another LAN located in a distant place to be used as if it is a directly-connected network.

In a LAN, not only the above-described VPN communication but also communication using no VPN is often performed. In such a case, a packet is firstly transmitted not to a relay server but to an apparatus (for example, a router) that functions as a default gateway. The apparatus that functions as a default gateway forwards the received packet in accordance with a destination of the packet.

Thus, in a case of communication with use of the VPN, it is necessary that a relay server is designated as a primary destination of a packet, and in a case of communication without use of the VPN, it is necessary that an apparatus that functions as a default gateway is designated as a primary destination of a packet. For this purpose, it is necessary to preset a gateway table in which a final destination of a packet and a primary destination of the packet are associated with each other.

However, in many cases, it is not until a VPN is built that an address of a communication partner through the VPN is revealed. Therefore, the gateway table needs to be updated each time a VPN is built, which results in a complicated process.

SUMMARY OF THE INVENTION

In view of the circumstances described above, preferred embodiments of the present invention provide a relay server that eliminates a process to update a gateway table which otherwise should be performed each time a VPN is built.

In a first preferred embodiment of the present invention, a relay server having the following configuration is provided. The relay server includes an address filter information storage unit, a virtual address registration information storage unit, a virtual address assignment information storage unit, and a control unit. The address filter information storage unit stores a first routing object address and a second routing object address, the first routing object address being an address of a first routing object device that is located in a first LAN and to which the relay server is able to forward a packet, the second routing object address being an address of a second routing object device to which a second relay server located in a second LAN is able to forward a packet. The virtual address registration information storage unit stores an address that is registered as a virtual address and that does not overlap in the first LAN. The virtual address assignment information storage unit stores the relationship of assignment of the virtual address to the second routing object address. The control unit transmits the first routing object address to the second relay server and receives the second routing object address from the second relay server, and establishes a routing session between the relay server and the second relay server. The control unit assigns the virtual address to the second routing object address and stores the relationship of the assignment into the virtual address assignment information storage unit. Upon receipt of a packet whose destination is the first routing object address from the routing session, the control unit refers to the virtual address assignment information storage unit and converts a source address of the packet into the virtual address assigned to the second routing object address, and forwards the packet to the first routing object device that is the destination. Upon receipt of a packet whose destination is the virtual address from the first routing object device, the control unit refers to the virtual address assignment information storage unit and converts a destination address of the packet into the second routing object address having the virtual address assigned thereto, and forwards the packet to the routing session.

Accordingly, by associating in advance the virtual address with the address of the relay server in a gateway table in which a destination address is associated with a gateway address, setting of the gateway table is eliminated, which conventionally should be performed each time a VPN is built.

In the relay server, it is preferable that whether or not to de-assign the virtual address assigned to the second routing object address at a time when the routing session is disconnected is settable.

Accordingly, in a case of building a VPN and performing communication, for example, setting is performed so as to de-assign the virtual address at a time when the routing session is disconnected, for a partner with which a VPN is less frequently built. This prevents occupation of a virtual address, and prevents a decrease in the number of assignable virtual addresses. On the other hand, for a partner with which a VPN is frequently built, setting is performed so as not to de-assign the virtual address at a time when the routing session is disconnected. This eliminates the need to assign a virtual address each time a VPN is built, which results in an efficient reduction in the throughput. Moreover, since the virtual address is not de-assigned, the communication can be performed always using the same virtual address. This simplifies management of the communication, and the like.

In the relay server, it is preferable that whether to assign the virtual address to the second routing object address and perform communication by using the virtual address or to perform communication by using the second routing object address is settable.

This achieves flexible communication based on network environments, the status of use of the address, and the like.

In the relay server, it is preferable that whether to perform communication by using the virtual address or to perform communication by using the second routing object address is settable for each relay server.

Accordingly, in a case of building a VPN and performing communication, for example, an actual address is used only for a partner with which a VPN is frequently built. This enables communication to be performed by using the same address even when the routing session is disconnected, while still preventing occupation of the virtual address.

In a second preferred embodiment of the present invention, a relay communication system having the following configuration is provided. The relay communication system includes a plurality of relay servers including a first relay server and a second relay server, and client terminals. The client terminals belong to the relay servers. The first relay server located in a first LAN includes a VPN group information storage unit, an address filter information storage unit, a virtual address registration information storage unit, a virtual address assignment information storage unit, and a control unit. The VPN group information storage unit stores routing apparatuses belonging to the same VPN group, the VPN group being a group made up of the routing apparatuses, the routing apparatuses being apparatuses that function as routing points from the relay servers and the client terminals, the VPN group allowing communication between the routing apparatuses via a virtual private network. The address filter information storage unit stores a first routing object address and a second routing object address, the first routing object address being an address of a first routing object device that is located in the first LAN and to which the first relay server is able to forward a packet, the second routing object address being an address of a second routing object device to which the second relay server located in a second LAN is able to forward a packet. The virtual address registration information storage unit stores an address that is registered as a virtual address and that does not overlap in the first LAN. The virtual address assignment information storage unit stores the relationship of assignment of the virtual address to the second routing object address. The control unit transmits the first routing object address to the second relay server and receives the second routing object address from the second relay server, and establishes a routing session between the first relay server and the second relay server. The control unit assigns the virtual address to the second routing object address and stores the relationship of the assignment into the virtual address assignment information storage unit. Upon receipt of a packet whose destination is the first routing object address from the routing session, the control unit refers to the virtual address assignment information storage unit and converts a source address of the packet into the virtual address assigned to the second routing object address, and forwards the packet to the first routing object device that is the destination. Upon receipt of a packet whose destination is the virtual address from the first routing object device, the control unit refers to the virtual address assignment information storage unit and converts a destination address of the packet into the second routing object address having the virtual address assigned thereto, and forwards the packet to the routing session.

Accordingly, by associating in advance the virtual address with the address of the relay server in the above-mentioned gateway table, setting of the gateway table is eliminated, which conventionally should be performed each time a VPN is built.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram showing a content of relay server information.

FIGS. 5A-5C are diagrams showing a content of client terminal information.

FIG. 6 is a diagram showing a content of VPN group information.

FIGS. 7A-7C are diagrams showing a content of address filter information that is registered in advance in each relay server.

FIG. 8 is a diagram showing a content stored in an address filter information storage unit after a VPN is built.

FIG. 9 is a diagram showing a content of virtual address registration information.

FIGS. 17A and 17B are diagrams for explaining the routing control using the virtual address.

FIG. 18 is a diagram showing a content of virtual address management information.

DETAILED DESCRIPTION OF THE PREFERRED EMBODIMENTS

Figure 1:
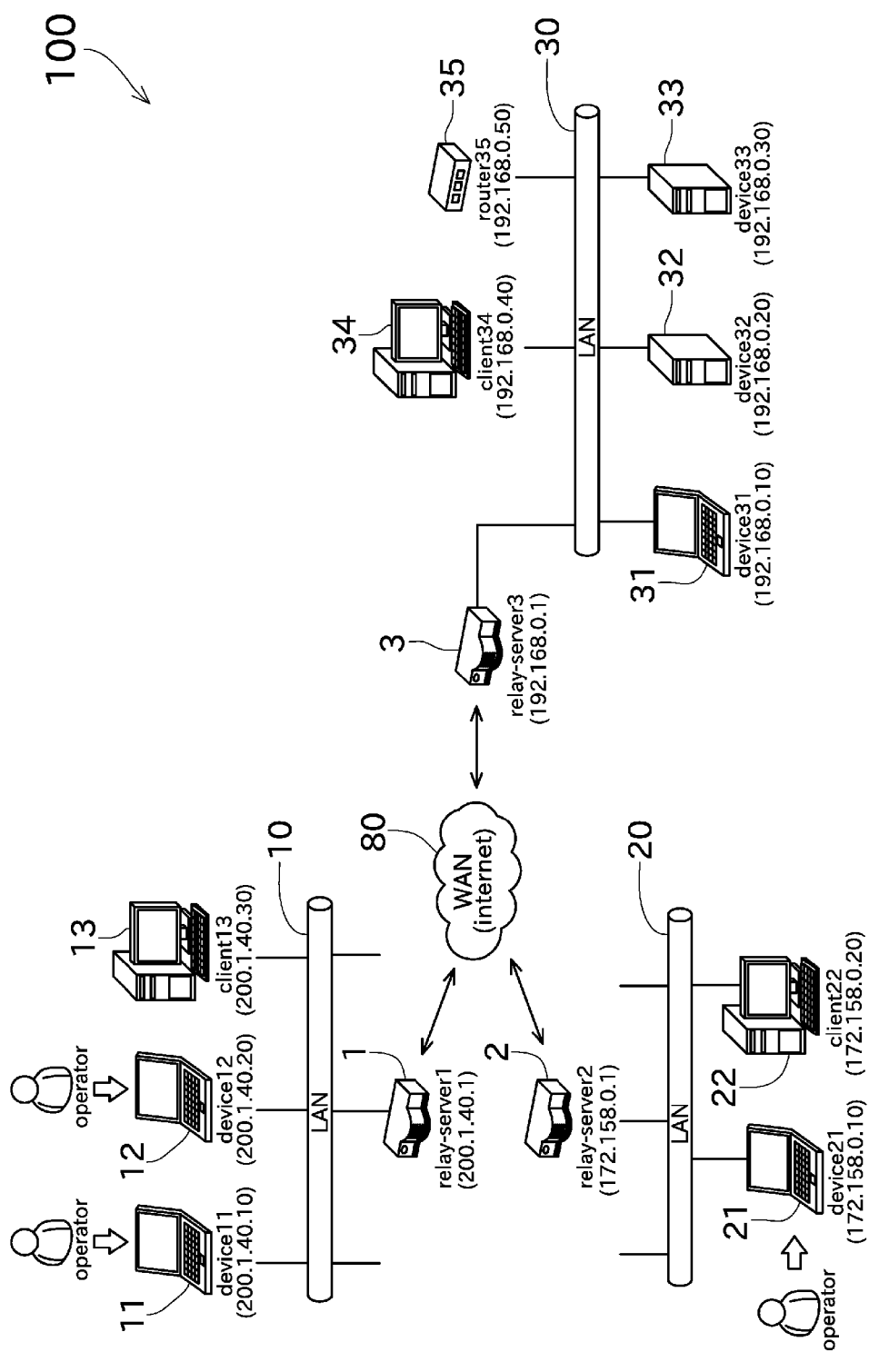
FIG. 1 is a diagram for explaining an overall configuration of a relay communication system according to a preferred embodiment of the present invention.

Next, preferred embodiments of the present invention will be described with reference to the drawings. Firstly, with reference to FIG. 1, an outline of a relay communication system 100 according to the present preferred embodiment will be described. FIG. 1 is an explanatory diagram showing an overall configuration of a relay communication system 100 according to this preferred embodiment.

As shown in FIG. 1, the relay communication system 100 includes a plurality of LANs 10, 20, and 30 that are connected to a Wide Area Network (WAN, Wide Area Network) 80. Each of the LANs 10, 20, and 30 is a relatively small network built in a limited place. The LANs 10, 20, and 30 are located in physically distant places. In this preferred embodiment, the Internet is preferably used as the WAN 80.

In the following, a specific description will be provided for each of the LANs. As shown in FIG. 1, a relay server (second relay server) 1, operation PCs 11 and 12 serving as second routing object devices, and a client terminal 13 are connected to the LAN (second LAN) 10. A relay server 2, an operation PC 21, and a client terminal 22 are connected to the LAN 20. A relay server (first relay server) 3, object terminals 31, 32, and 33 serving as first routing object devices, a client terminal 34, and a router 35 are connected to the LAN (first LAN) 30.

Each of the relay servers 1, 2, and 3 is connected not only to each of the LANs 10, 20, and 30 but also to the WAN 80, and therefore able to communicate not only with the apparatuses connected to the same LAN but also with the relay servers connected to the other LANs. The operation PCs 11, 12, and 21 preferably are, for example, personal computers that can be operated by operators. The object terminals 31, 32, and 33 preferably are personal computers, file servers, or the like. In an assumed example case, for example, the operator operates the operation PC 11 to request predetermined data from the object terminal 31 and update a content stored in the object terminal 31. The client terminals 13, 22, and 34, which are configured as personal computers, for example, are able to communicate with one another via the relay servers 1, 2, and 3 that they belong to. The router 35 is an apparatus that functions as a default gateway of the LAN 30.

Figures 2, 3:
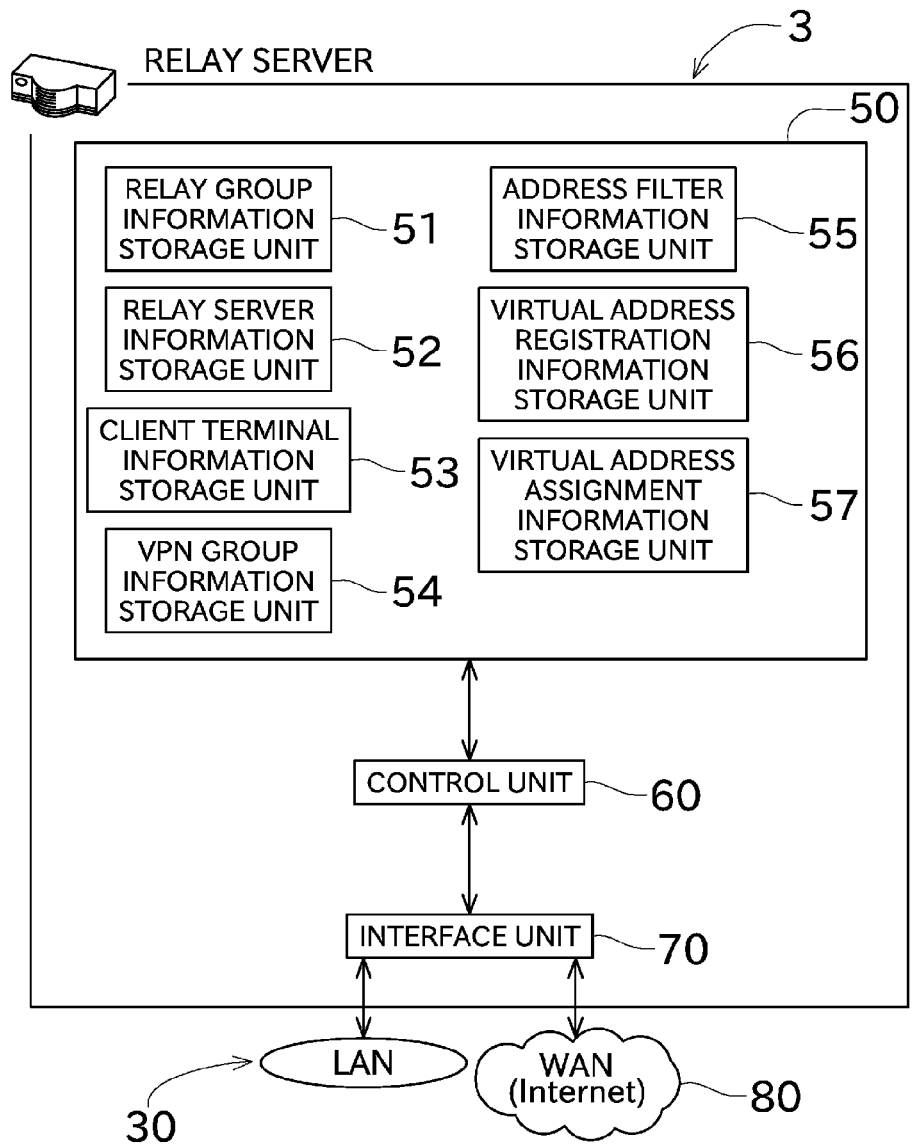
FIG. 2 is a function block diagram of a relay server.
FIG. 3 is a diagram showing a content of relay group information.

Next, detailed configurations of the relay servers 1, 2, and 3 will be described with reference to FIG. 2. FIG. 2 is a functional block diagram of the relay server 3. Since the configuration of the relay server 3 is substantially the same as the configurations of the relay servers 1 and 2, the following description will focus mainly on the relay server 3.

As shown in FIG. 2, the relay server 3 includes a storage unit 50, a control unit 60, and an interface unit 70.

The interface unit 70 is, for example, a connector that connects apparatuses that perform communication. The interface unit 70 is configured to perform communication with a terminal located in the LAN 10 by using a private IP address and to perform communication via the WAN 80 by using a global IP address. The interface unit 70 performs an appropriate process on a packet received from the LAN 30 side or the WAN 80 side, and outputs a result to the control unit 60.

The control unit 60 is, for example, a CPU with control and computation functions, and able to execute various kinds of processing based on a program read out from the storage unit 50. The control unit 60 is able to control various kinds of communication in accordance with a protocol such as TCP/IP, UDP, or SIP. To be specific, the control unit 60 determines a destination of a received packet based on information indicated by the packet and information stored in the storage unit 50, and then transmits the packet to the destination thus determined. The control unit 60 is able to update a content stored in the storage unit 50 based on information received from another terminal.

Figures 10, 11, 12:
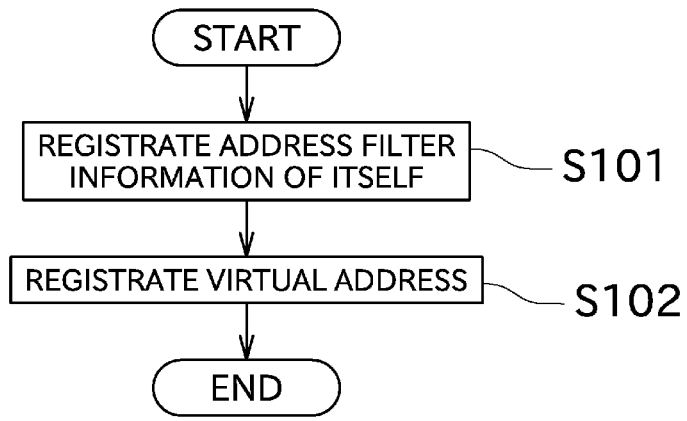
FIG. 10 is a diagram showing a content of virtual address assignment information.
FIG. 11 is a diagram showing a content of a gateway table that is set for object terminals.
FIG. 12 is a flowchart showing a setting process performed in the relay server in advance.

The storage unit 50 preferably is, for example, configured as a hard disk or a non-volatile RAM, and able to store various types of data. The storage unit 50 includes a relay group information storage unit 51, a relay server information storage unit 52, a client terminal information storage unit 53, a VPN group information storage unit 54, an address filter information storage unit 55, a virtual address registration information storage unit 56, and a virtual address assignment information storage unit 57. The relay servers 1 and 2 do not perform communication with the use of a virtual address which will be described later, and therefore do not include the virtual address registration information storage unit 56 and the virtual address assignment information storage unit 57. Hereinafter, a content stored in the storage unit 50 will be described with reference to FIGS. 3 to 10. FIGS. 3 to 10 are diagrams mainly showing contents stored in the storage unit 50 of the relay server 3 (FIGS. 5A-5C and 7A-7C also show contents stored in the relay servers 1 and 2). FIG. 11 is a diagram showing a content of a gateway table that is set for the object terminals 31, 32, and 33.

The relay group information storage unit 51 stores relay group information indicating a relay group and a relay server that forms this relay group.

As shown in FIG. 3, in the relay group information, a group tag and site tags that are child elements whose parent element is the group tag are described. In the group tag, group information 511 concerning a relay group is described. As the group information 511, identification information ("id") of the relay group, a last modification time ("lastmod"), and a name ("name") of the relay group, are described. In the site tags, group configuration information 512 concerning relay servers of the relay group is described. In the group configuration information 512, identification information ("id") of these relay servers is described. An additional relay group can be provided or formed. In such a case, a new relay group is given unique identification information different from those of the other relay groups. This enables setting such that, for example, data exchange is performed only within a specific relay group.

The relay group information is shared among the relay servers 1, 2, and 3 of this relay group. In a case where a certain relay server performs a process to change the relay group, it is transmitted to the other relay servers and the relay group information is updated. In this manner, the relay group information is dynamically shared.

The relay server information storage unit 52 stores relay server information indicating an outline of a relay server that performs relay communication and a client terminal that belongs to this relay server.

In the relay server information shown in FIG. 4, site tags each described for each relay server, and node tags that are child elements whose parent elements are the site tags, are described. In the site tag, server information 521 concerning the relay server 1 is described. As the server information 521, identification information ("id") of the relay server, a name ("name") of the relay server, and start-up information ("stat"), are described. The "stat" being "active" indicates that the relay server logs in to the relay communication system 100, and the "stat" being blank indicates that the relay server is logging off. In the node tag that is the child element of the site tag, belonging information 522 indicating a client terminal belonging to the relay server is described. As the belonging information 522, a name ("group") of the relay group to which a client terminal belongs, identification information ("id") of the client terminal, a name ("name") of the client terminal, and identification information ("site") of the relay server to which the client terminal belongs, are described. When the client terminal does not log in to the relay communication system 100, the "site" is blank.

Communication by the relay group is performed based on the above-described relay group information and relay server information, in the following manner. For example, in a case where a packet is transmitted from the client terminal 13 to the client terminal 22, the client terminal 13 firstly transmits a packet to the relay server 1 that is the relay server to which the client terminal 13 itself is connected. Here, a relay server capable of packet exchange can be recognized based on the above-described relay group information, and the identification information of a client terminal belonging to the relay server, and whether or not the client terminal is connected, can be determined based on the above-described relay server information. Based on such information, the relay server 1 forwards the packet to the relay server 2 that is the relay server to which the client terminal 22 is connected. Then, the relay server 2 receives the packet, and forwards the packet to the client terminal 22. As a result, relay communication is performed between the client terminals 13 and 22.

As for the relay server information as well as the relay group information, the information is shared among the relay servers 1, 2, and 3 that define this relay group. In a case where a certain relay server performs a process to change the relay server information, it is transmitted to the other relay servers and the relay server information is updated. In this manner, the relay server information is dynamically shared.

The client terminal information storage unit 53 stores client terminal information that is detailed information concerning a client terminal. Each of the relay servers 1, 2, and 3 stores the client terminal information concerning only the client terminal belonging to itself. Since the client terminal 34 belongs to the relay server 3, the client terminal information storage unit 53 included in the relay server 3 stores only the client terminal information of the client terminal 34.

The client terminal information stored in the client terminal information storage unit 53 of the relay server 3 is shown in FIG. 5C. Likewise, the client terminal information stored in the relay server 1 is shown in FIG. 5A, and the client terminal information stored in the relay server 2 is shown in FIG. 5B.

In the client terminal information shown in FIGS. 5A-5C, a node tag is described. In the node tag, a private IP address ("addr") of a client terminal, a name ("group") of a relay group to which the client terminal belongs, identification information ("id"), a name ("name"), a passcode ("pass") for logging in to a relay server, and port information ("port"), are described.

The VPN group information storage unit 54 stores VPN group information that is information concerning a VPN group including apparatuses (hereinafter referred to as routing apparatuses) that are selected as routing points from client terminals and relay servers that form a relay group. Establishing a routing session among routing apparatuses that belong to the same VPN group allows communication with use of a VPN to be started.

In the VPN group information shown in FIG. 6, a vnet tag is described. In the vnet tag, VPN group basic information 541, routing point information 542, and routing session information 543, are described. In the VPN group basic information 541, a name ("group") of a relay group to which a VPN group belongs, identification information ("id") of the VPN group, a last modification time ("lastmod"), and a name ("name") of the VPN group, are described. In the routing point information 542, identification information of routing apparatuses that perform routing at a time of performing communication in the VPN group is described. In an example shown in FIG. 6, the relay server 1 and the relay server 3 are described as the routing apparatuses. In the routing session information 543, the routing apparatuses that are to be connected to one another in the VPN group are described. In the routing session information 543, the routing apparatuses are defined such that they are classified into the side ("sp (start point)") that takes initiative to perform a communication control and the side ("ep (end point)") that receives the communication control during a routing session establishment process to build a VPN to start communication in the VPN group. In the following description, the routing apparatus in the side that takes initiative to perform the communication control to establish the routing session may be sometimes referred to as "start point", and the routing apparatus in the side that receives such a communication control may be sometimes referred to as "end point".

The VPN group information shown in FIG. 6 shows that a VPN group (VPN-GROUP1) includes the relay server 1 and the relay server 3. It is also shown that, at a time of starting this VPN group, a communication control to establish a routing session is performed from the relay server 3 to the relay server 1.

The VPN group information, as well as the relay server information and the relay group information, is shared among the relay servers 1 and 3 that belong to the same VPN group. In a case where a certain relay server performs a process to change the VPN group information, it is transmitted to the other relay servers belonging to the same VPN group, and the VPN group information is updated. In this manner, the VPN group information is dynamically shared. A process for making the VPN group will be described later.

The address filter information storage unit 55 stores address filter information that is information used at a time of performing a routing control with use of the VPN. Before the VPN is built, the address filter information storage unit 55 stores information (address filter information of the relay server 3) indicating a device (routing object device) to which the relay server 3 itself is able to directly transmit a packet. The address filter information includes an address (routing object address) of the routing object device and a name of the routing object device.

FIG. 7C shows an example of the address filter information that is registered in advance in the relay server 3 itself. In this example, the object terminals 31, 32, and 33 are apparatuses to which the relay server 3 is able to directly transmit a packet. FIG. 7A shows the address filter information that is registered in advance in the relay server 1. FIG. 7B shows the address filter information that is registered in advance in the relay server 2.

As described above, before the VPN is built, the address filter information storage unit 55 of the relay server 3 stores only the address filter information shown in FIG. 7C. At a time of, for example, establishing a routing session with the relay server 1, the relay server 3 transmits to the relay server 1 the address filter information (FIG. 7C) that is registered in advance in the relay server 3 itself, and receives the address filter information (FIG. 7A) from the relay server 1. Then, the relay server 3 associates the address filter information of the relay server 1 with the identification information of the relay server 1, and stores the address filter information of the relay server 1 into the address filter information storage unit 55.

As a result, a content shown in FIG. 8 is stored in the address filter information storage unit 55 of the relay server 3. Information having the same content is stored in the VPN group information storage unit 54 of the relay server 1, too. Based on the addresses thus obtained, the relay servers 1 and 3 perform a routing control (details of the control will be described later). Hereinafter, the routing object address included in the address filter information of the relay server 3 itself may be referred to as a first routing object address, and the routing object address included in the address filter information of another routing apparatus may be referred to as a second routing object address.

In this preferred embodiment, preferably only the communication performed between the relay server 3 and the object terminals 31, 32, 33 is performed with use of virtual addresses instead of actual addresses (the second routing object addresses) of the operation PCs 11 and 12. As the virtual address, an address that does not overlap within the LAN 30 (an address that has not yet been assigned to or reserved for any apparatus within the LAN 30) is registered in advance and stored in the virtual address registration information storage unit 56. In this preferred embodiment, addresses shown in FIG. 9 are registered as the virtual addresses.

After exchanging the address filter information and obtaining the second routing object address in the above-described manner, the relay server 3 assigns the virtual address to the second routing object address (actual address). As shown in FIG. 10, the virtual address assignment information storage unit 57 stores the relationship of assignment of the virtual addresses to the second routing object addresses. In the communication performed between the relay server 3 and the object terminals 31, 32, 33, communication is performed with use of the virtual address instead of the actual address. For example, in a case where the object terminal 31 transmits a packet to the operation PC 11, not the second routing object address but the virtual address is used as a destination address, though a detailed flow of the communication will be described later.

The router 35 functions as the default gateway of the LAN 30, as mentioned above. Therefore, in principle, a primary destination (a transit destination or a gateway) of a packet transmitted by the object terminal 31 is the router 35. The router 35 forwards a received packet in accordance with a final destination of the packet. In a case of performing the communication with use of the VPN described above, the primary destination of the packet transmitted by the object terminal 31 or the like needs to be the relay server 3 instead of the router 35. In this preferred embodiment, therefore, a gateway table shown in FIG. 11 is set for the object terminals 31, 32, and 33. FIG. 11 shows a table in which a final destination address ("packet destination address") of a packet transmitted by the object terminal 31, 32, 33 is associated with a gateway used when this destination address is designated. As shown in FIG. 11, in this preferred embodiment, when the final destination of a packet is a virtual address, the gateway for this packet is the relay server 3, while when the final destination of a packet is not a virtual address, the gateway for this packet is the router 35.

Normally, the second routing object address is unknown until the VPN is built. This is why it has been conventionally necessary to perform a setting process (updating of the gateway table) to associate a second routing object address with a relay server each time a VPN is built. In this respect, in the present preferred embodiment which adopts a virtual address, the relay server 3 is, in advance, set as the gateway of a packet whose destination is the virtual address. In a case where a packet is transmitted with use of the VPN, the destination of this packet is the virtual address. Accordingly, the relay server 3 can be set as the gateway of a packet transmitted through the VPN without updating of the gateway table of the object terminals 31, 32, and 33. This reduces throughput as compared with a conventional configuration.

Figure 13:
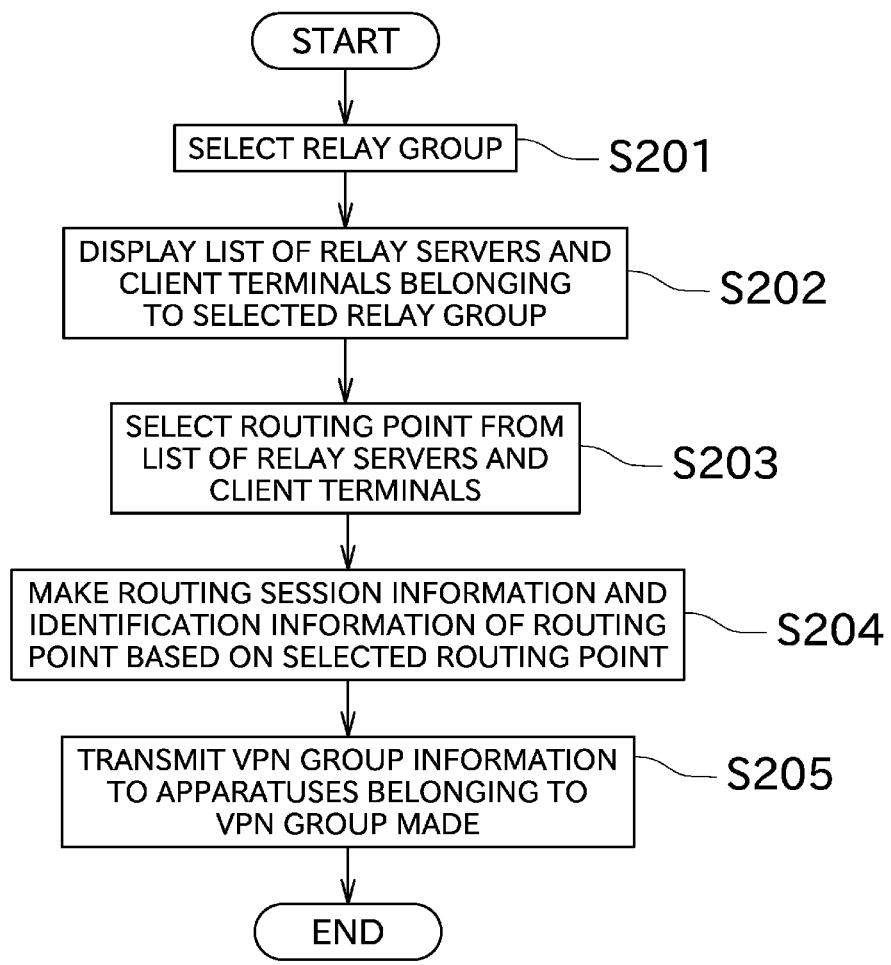
FIG. 13 is a flowchart showing a process for making a VPN group.

Next, a preparation for the communication with use of the VPN will be described. Firstly, a setting process that is performed on the relay server in advance will be described with reference to FIG. 12. Then, a flow of making the VPN group will be described with reference to FIG. 13. FIG. 12 is a flowchart showing a setting process that is performed on the relay server in advance. FIG. 13 is a flowchart showing a process for making the VPN group.

The setting process that is performed on the relay server in advance includes registration of the address filter information of itself (relay server) (S101). For this registration, a user of the relay communication system 100 inputs, in a predetermined manner, the address (the first routing object address) and the name of an apparatus or the like that should be designated as the routing object device of the relay server Then, in a case of performing communication with use of the virtual address, the user registers, as a virtual address, an address that does not overlap within the LAN to which the relay server is connected (S102). The virtual address registered at this time is stored into the virtual address registration information storage unit 56.

In the following, a flow of making the VPN group will be described. Firstly, a user can display a VPN group setting screen by operating the client terminals 13, 22, 34, or the like. In a case illustrated herein, setting is performed using the client terminal 34. In the setting screen displayed on the client terminal 34, a plurality of relay groups to which this client terminal 34 belongs are displayed. The user selects, from the plurality of relay groups, a relay group in which he/she desires to build a VPN group (S201).

After a relay group is selected, a list of identification information of relay servers and client terminals that belong to the selected relay group and are able to function as routing points, is displayed in a screen of the client terminal 34 (S202). Then, the user selects the relay server and the client terminal that are to function as the routing points in the VPN group to be built (S203). In the case described herein, it is assumed that the relay server 1 and the relay server 3 are selected by the user.

Then, the identification information of the routing points and the routing session information are made based on the identification information of the selected relay servers (S204). The identification information of the VPN group, and the like, are added to the identification information of the routing points and the routing session information. As a result, the VPN group information shown in FIG. 6 is provided. The client terminal 34 transmits this VPN group information to the relay servers 1 and 3 that belong to the same VPN group (S205). The relay servers 1 and 3 stores the received VPN group information into the VPN group information storage unit 54. Through these steps, a process for building the VPN group is completed.

Figure 14:
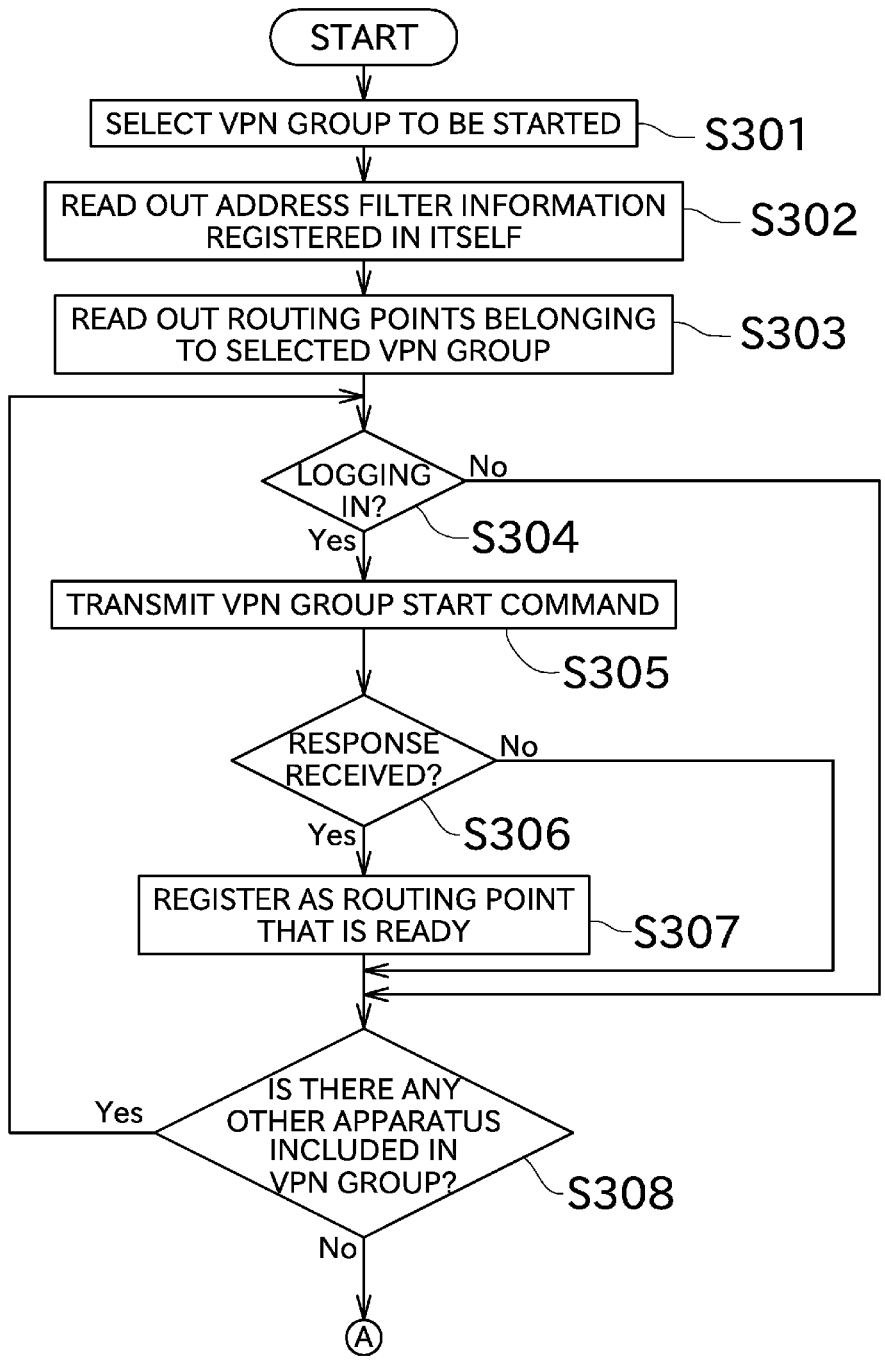
FIG. 14 is a flowchart showing a VPN building process.
Figure 15:
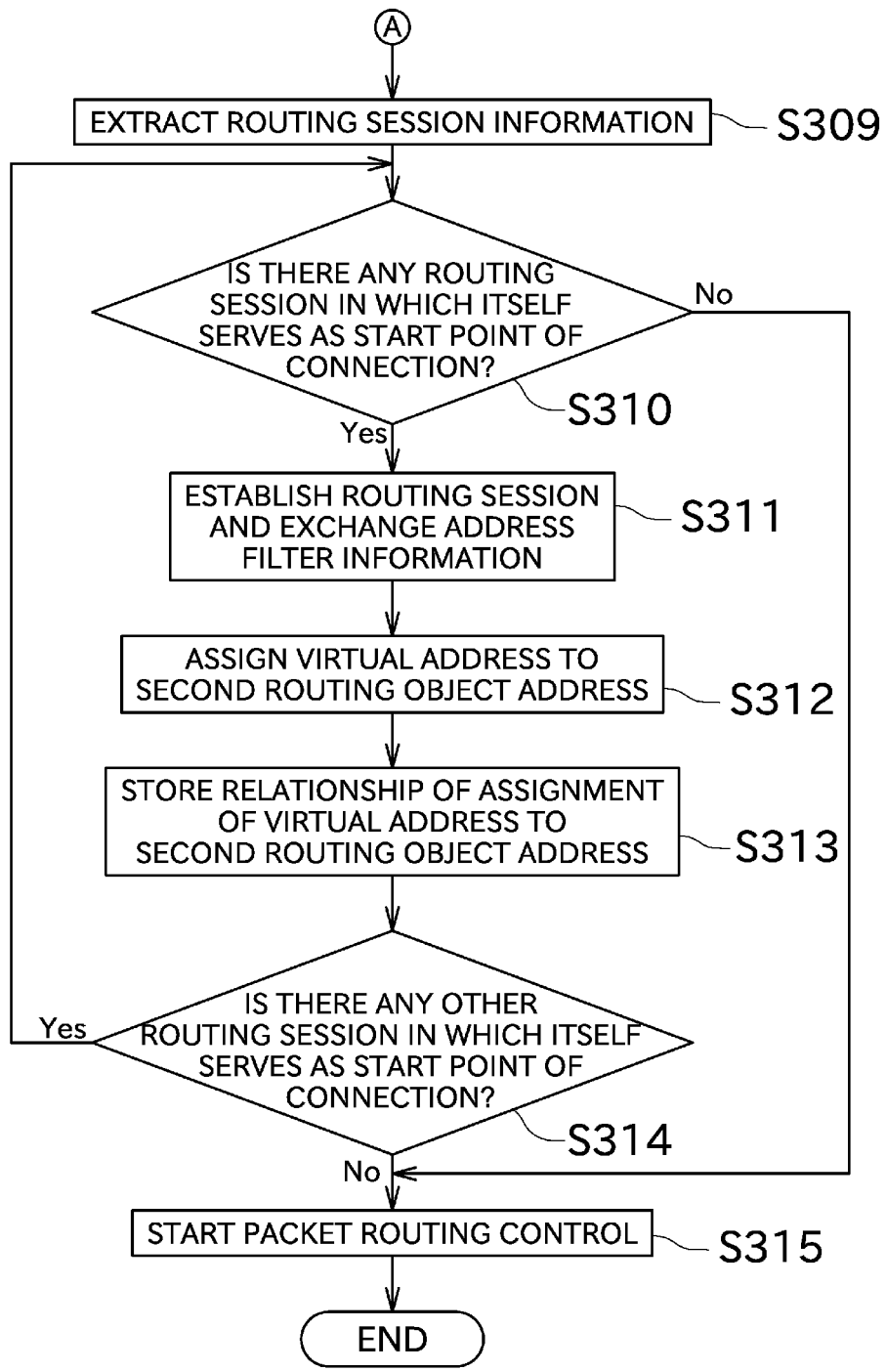
FIG. 15 is a flowchart showing the VPN building process.

Next, a flow of a process before communication with the use of the VPN is started in the built VPN group will be described with reference to FIGS. 14 and 15. FIGS. 14 and 15 are flowcharts showing a process performed before the communication with use of the VPN is started.

The user can cause the built VPN groups to be displayed in a screen by operating, for example, the client terminal 13 or the operation PC 11. Then, by selecting an appropriate VPN group from the displayed VPN groups (S301), the user is able to cause the VPN building process to be performed. Herein, a case where the relay server 3 performs a process to start the VPN group (the VPN group made up of the relay servers 1 and 3) made in the above-described manner, will be described.

The relay server 3 firstly reads out the address filter information associated with the relay server 3 itself (S302). The information read out at this time is the content registered in S101 (the content shown in FIG. 7C). Then, the relay server 3 reads out the routing points that belong to the selected VPN group (S303). As a result, based on the content of the VPN group information shown in FIG. 6, the relay server 1 is read out.

The relay server 3 determines whether or not the relay server 1 is currently logging in (whether "stat" is active or blank), based on the relay server information (S304). Since the relay server information shown in FIG. 4 indicates that the relay server 1 is currently logging in, the relay server 3 transmits a VPN-group start command together with the identification information of the VPN group to the relay server 1 (S305).

Upon receipt of a response from the relay server 1 (S306), the relay server 3 registers the relay server 1 as a routing point that has been ready to start the VPN (S307).

Then, the relay server 3 determines whether or not there is any other apparatus belonging to the same VPN group (S308). The VPN group that is currently made includes only the relay server 1 and the relay server 3, and there is no other apparatus. If there is any other apparatus, the relay server 3 performs the steps S304 to S307 on this apparatus.

Next, the relay server 3 extracts the routing session information from the content stored in the VPN group information storage unit 54 (S309 in FIG. 15). Then, the relay server 3 refers to the routing session information extracted, to determine whether or not a routing session in which the relay server 3 itself serves as a start point is described therein (S310). In the routing session information shown in FIG. 6, it is described that the relay server 3 itself serves as a start point in a routing session established between the relay server 1 and the relay server 3.

Accordingly, the relay server 3 performs a communication control on the relay server 1, to establish a routing session (S311). At a time of performing the communication control, the address filter information is exchanged as mentioned above (S311). As a result, the content shown in FIG. 8 is stored into the address filter information storage unit 55 of the relay server 3.

Then, the relay server 3 assigns a virtual address to the second routing object address included in the address filter information that is received from the relay server 1 (S312), and stores the relationship of this assignment into the virtual address assignment information storage unit 57 (S313). The virtual address assigned in S312 may be any address as long as it is a virtual address that is registered in the virtual address registration information storage unit 56 and that has not yet been assigned to any second routing object address.

Thus, in this preferred embodiment, in building a VPN, each of the routing apparatuses is able to exchange (obtain) the address filter information with the other routing apparatuses, and therefore the VPN can be built with the use of the latest address filter information. Accordingly, even in a case where the address filter information concerning unit of the routing apparatuses has been changed before the VPN is started, the VPN can be built to start communication under a state where such a change is reflected in all the routing apparatuses. This prevents occurrence of inconsistency in the routing of a packet, and can improve the reliability.

Then, the relay server 3 determines whether or not any other routing session in which the relay server 3 itself serves as a start point of connection is described (S314). Since the VPN group that is currently made includes only the relay server 1 and the relay server 3, no other routing session is described in the VPN group information. Therefore, the relay server 3 starts the packet routing control (S315). If there is any other routing session, the relay server 3 performs the steps S310 to S313 again.

Even in a case where there is no routing session in which the relay server 3 itself serves as a start point of connection in S310 (even in a case where the relay server 3 itself serves as an end point of routing), which is not shown in the flowchart of FIG. 15, the routing session establishment process and the exchange of the address filter information are performed under the communication control by a routing apparatus serving as a start point. In a case of performing communication with use of the virtual address, the assignment of the virtual address, and the like, are also performed.

Each of the routing apparatuses does not perform an initial communication control to establish a routing session unless it is described in the routing session information that itself should be a start point. This prevents collision of the communication control, and establishes a routing session between apparatuses by means of a simple control.

Figure 16:
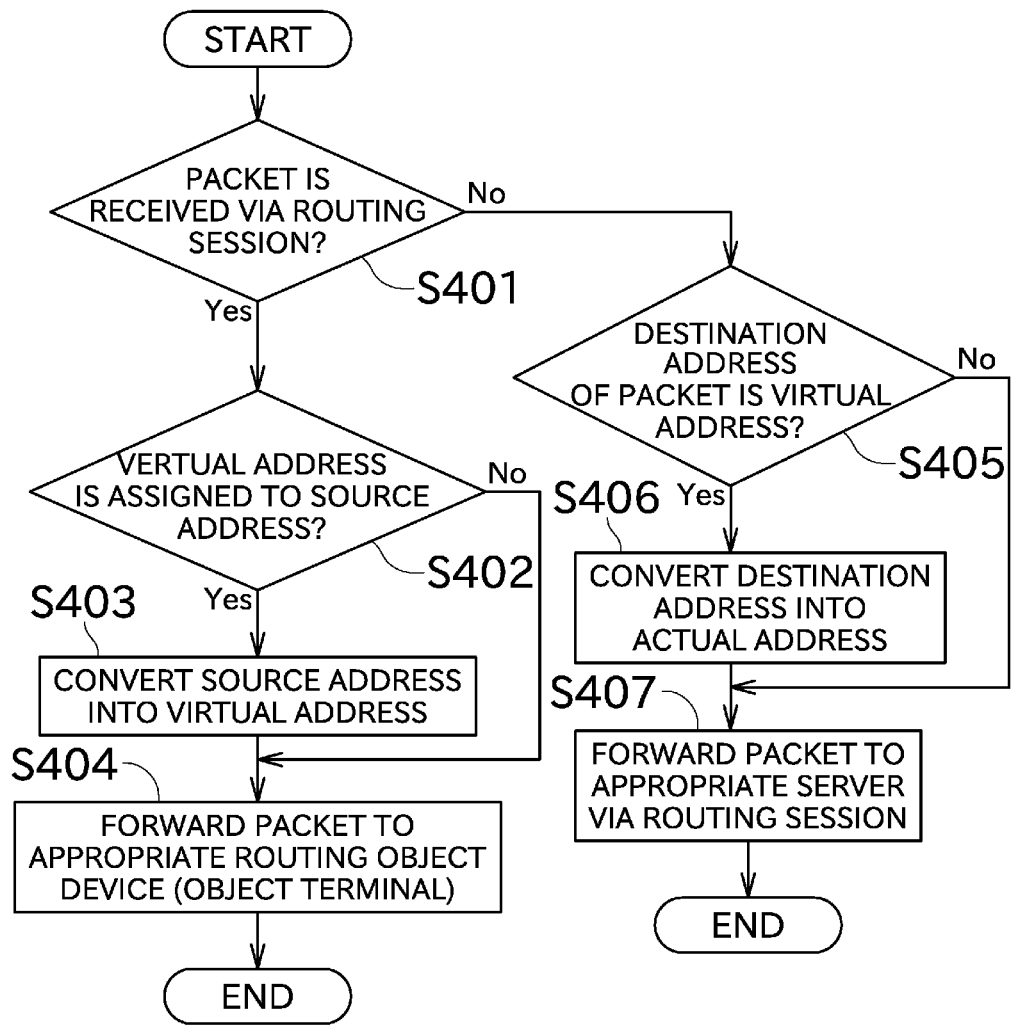
FIG. 16 is a flowchart showing a routing control using a virtual address.

Next, a process to route a packet by using the established routing session will be described with reference to FIGS. 16, 17A, 17B and the like. FIG. 16 is a flowchart showing a routing control using a virtual address. FIGS. 17A and 17B are diagrams for explaining the routing control using the virtual address. In the following, a description will be given to a routing control that is performed when a packet is transmitted from the operation PC 11 to the object terminal 31 and a packet is transmitted back from the object terminal 31 to the operation PC 11. In this preferred embodiment, a routing apparatus that performs communication with use of the virtual address is the relay server 3 alone. Therefore, a process shown in FIG. 16 is a process performed only by the relay server 3.

Firstly, a flow of transmitting a packet from the operation PC 11 to the object terminal 31 will be described with reference to FIG. 16 and FIG. 17A. As shown in FIG. 17A, the operation PC 11 designates the address (192.168.0.10) of the object terminal 31 as a destination address and designates the address (200.1.40.10) of the operation PC 11 itself as a source address, to transmit a packet. The relay server 1 receives the packet, and compares the packet destination address of the received packet against the address filter information (FIG. 8) stored therein. Then, the relay server 1, which recognizes that the destination address is associated with the relay server 3, forwards the packet to the relay server 3 via the routing session.

The relay server 3 receives the packet, and determines whether the received packet is a packet received via the routing session or not (that is, or the received packet is a packet received from the routing object device of the relay server 3 itself) (S401 in FIG. 16). Since the received packet is received via the routing session, the relay server 3 determines whether or not there is any virtual address associated with the source address (S402). As shown in FIG. 10, a virtual address is assigned to the address of the operation PC 11. Therefore, the relay server 3 converts the source address (200.1.40.10) of the received packet into the virtual address (150.100.10.1) (S403). Then, the relay server 3 forwards the packet to an apparatus (object terminal 31) indicated by the destination address (S404).

Next, a flow of transmitting a packet from the object terminal 31 back to the operation PC 11 will be described with reference to FIG. 17B. As shown in FIG. 17B, the object terminal 31 designates, as a destination address, the source address (150.100.10.1; virtual address) of the packet that has been received from the operation PC 11, and designates, as a source address, the address (192.168.0.10) of the object terminal 31 itself.

As shown in FIG. 11, the gateway table of the object terminal 31 describes that the relay server 3 serves as the gateway when the destination is a virtual address. Thus, the object terminal 31 transmits the packet to the relay server 3.

The relay server 3 receives the packet, and in the same manner as described above, determines whether the received packet is a packet received via the routing session or not (S401 in FIG. 16). The received packet is received from the object terminal 31 that is a routing object device of the relay server 3 itself. Therefore, the relay server 3 determines whether or not the destination address is a virtual address (S405). Since the packet destination address is a virtual address, the relay server 3 converts the packet destination address (150.100.10.1) of the received packet into the second routing object address (200.1.40.10) which is an actual address (S406). Then, the relay server 3 transmits the packet to an appropriate routing apparatus via the routing session (S407). More specifically, the relay server 3 compares the packet destination address against the address filter information (FIG. 8) stored therein. Then, the relay server 3, which recognizes that the destination address is associated with the relay server 1, forwards the packet to the relay server 1 via the routing session.

The relay server 1 receives the packet, and, based on the destination address, transmits the packet to the operation PC 11. The routing control using the virtual address is performed in this manner.

In this preferred embodiment, in a case where the routing session established between the relay server 1 and the relay server 3 is disconnected (cases where a communication failure occurs or where a VPN end process is performed), the virtual address assigned to the second routing object address is de-assigned. At a time when a routing session is established again between the relay server 1 and the relay server 3, a virtual address is assigned.

As thus far described, the relay server 3 includes the address filter information storage unit 55, the virtual address registration information storage unit 56, the virtual address assignment information storage unit 57, and the control unit 60. The address filter information storage unit 55 stores the first routing object address and the second routing object address. The virtual address registration information storage unit 56 stores an address that is registered as a virtual address and that does not overlap within the LAN 30. The virtual address assignment information storage unit 57 stores the relationship of assignment of the virtual address to the second routing object address. The control unit 60 is configured and programmed to perform a control to transmit the first routing object address to the relay server 1 and receive the second routing object address from the relay server 1, and establish a routing session between the relay server 3 and the relay server 1. The control unit 60 is configured and programmed to perform a control to assign the virtual address to the second routing object address and store the relationship of the assignment into the virtual address assignment information storage unit 57. The control unit 60 is configured and programmed to perform a control to, upon receipt of a packet from the routing session, convert a source address of the packet from an actual address into a virtual address and forward the packet to a routing object device of the relay server 3 itself. The control unit 60 is configured and programmed to perform a control to, upon receipt of a packet from a routing object device of the relay server 3 itself, convert a destination address of the packet from a virtual address into an actual address and forward the packet to the routing session.

Accordingly, by associating in advance the virtual address with the address of the relay server in a gateway table in which a destination address is associated with a gateway address, setting of the gateway table can be eliminated, which conventionally should be performed each time a VPN is built.

Next, a modification of the above-described preferred embodiment will be described. This modification adopts the configuration of the above-described preferred embodiment, and additionally enhances settable items. To be specific, this modification allows setting of: (1) whether or not to de-assign the virtual address assigned to the second routing object address at a time when the routing session is disconnected; and (2) whether to perform communication with the use of the virtual address or to perform communication with use of the second routing object address. The items (1) and (2) can be individually set for each routing apparatus.

More specifically, the relay server 3 of this modification, which has the above-described configuration, is additionally configured to store virtual address management information as shown in FIG. 18. FIG. 18 is a diagram showing an example of virtual address management information. In the virtual address management information, "name", "address used", and "virtual address assignment in case of session disconnection", are described. The "name" describes a partner with which a VPN group is built. The "address used" describes the set item concerning (2) above. The "virtual address assignment in case of session disconnection" describes the set item concerning (1) above.

In the example shown in FIG. 18, it is described that a virtual address is assigned to a routing object device of the relay server 1 and that the virtual address is de-assigned when the routing session is disconnected. This configuration is identical to the configuration of the preferred embodiment described above. In this example, it is also described that a virtual address is assigned to a routing object device of the relay server 2 and that the virtual address is kept assigned even when the routing session is disconnected (the content of the virtual address assignment information is not deleted). It is also described that a virtual address is not assigned to a routing object device of a relay server 4 (not shown in FIG. 1) so that communication is performed with use of an actual address.

Accordingly, for example, setting is made so as to de-assign the virtual address for a partner with which a VPN is less frequently built. This prevents occupation of a virtual address, and prevents a decrease in the number of assignable virtual addresses. On the other hand, for a partner with which a VPN is frequently built, setting is made so as not to de-assign the virtual address. This eliminates the need to assign a virtual address each time a VPN is built, which results in a reduction in the throughput. Moreover, since the communication can be performed always using the same virtual address, management of the communication, and the like, can be simplified.

While preferred embodiments of the present invention and a modification thereof have been described above, the above-described configurations can be changed, for example, as follows.

In the above-described configuration, the address filter information preferably is exchanged substantially simultaneously with establishment of the routing session. Alternatively, it may be also acceptable that the address filter information is transmitted together with the VPN-group start command (S305) and the address filter information is received together with a response (S306).

Although an individual apparatus such as the operation PC 11 preferably serves as the routing object device in the above-described configuration, it may be also acceptable that, for example, the entire LAN 10 (200.1.40.0/24) is set as the routing object device of the relay server 1. In this case, a virtual address of a specified range, such as (192.168.0.0/24), is assigned to the routing object device.

The virtual address may be assigned at any timing. For example, in a configuration in which the address filter information is transmitted together with a start command, the virtual address can be assigned at an earlier timing.

In the above-described configuration, only the relay server functions as the routing point. Instead, the client terminal may function as the routing point. The number of routing points within the VPN group is not limited to two, and may be three or more. It may be acceptable that one routing apparatus belongs to a plurality of VPN groups.

A format in which the above-described relay group information, relay server information, client terminal information, VPN group information, address filter information, and the like, are stored is not limited to XML format. These kinds of information can be stored in any appropriate format.

Instead of the configuration of the above-described preferred embodiments, a configuration is also acceptable in which an external server used for communication between relay servers is placed on the Internet and caused to exert a function as an SIP (Session Initiation Protocol) server, thus performing communication.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay server comprising:
    an address filter information storage arranged to store a first routing object address and a second routing object address, the first routing object address being an address of a first routing object device that is located in a first LAN and to which the relay server is able to forward a packet, the second routing object address being an address of a second routing object device to which a second relay server located in a second LAN is able to forward a packet;
    a virtual address registration information storage arranged to store an address that is registered as a virtual address and that does not overlap in the first LAN, the virtual address being included in a gateway table of the first routing object device, and the relay server is set as the gateway of a packet whose destination is the virtual address in the gateway table;
    a virtual address assignment information storage arranged to store a relationship of assignment of the virtual address to the second routing object address; and
    a controller configured and programmed to perform control to:
        transmit the first routing object address to the second relay server and receive the second routing object address from the second relay server, and establish a routing session between the relay server and the second relay server;
        assign the virtual address to the second routing object address and store the relationship of the assignment into the virtual address assignment information storage;
        upon receipt of a packet whose destination is the first routing object address from the routing session, refer to the virtual address assignment information storage and convert a source address of the packet into the virtual address assigned to the second routing object address, and forward the packet to the first routing object device that is the destination; and
        upon receipt of a packet whose destination is the virtual address from the first routing object device, refer to the virtual address assignment information storage and convert a destination address of the packet into the second routing object address having the virtual address assigned thereto, and forward the packet to the routing session.

2. The relay server according to claim 1, wherein whether or not to de-assign the virtual address assigned to the second routing object address at a time when the routing session is disconnected is settable.

3. The relay server according to claim 1, wherein whether to assign the virtual address to the second routing object address and perform communication by using the virtual address or to perform communication by using the second routing object address is settable.

4. The relay server according to claim 3, wherein whether to perform communication by using the virtual address or to perform communication by using the second routing object address is settable for each relay server.

5. A relay communication system comprising:
    a plurality of relay servers including a first relay server and a second relay server;
    a first routing object device that includes a gateway table;
    a second routing object device; and
    client terminals belonging to the first and second relay servers; wherein
    the first relay server is located in a first LAN and includes:
        a VPN group information storage arranged to store information on routing apparatuses belonging to a same VPN group that is a group made up of the routing apparatuses such that the routing apparatuses function as routing points from the first and second relay servers and the client terminals, the VPN group allowing communication between the routing apparatuses via a virtual private network;
        an address filter information storage arranged to store a first routing object address and a second routing object address, the first routing object address being an address of the first routing object device that is located in the first LAN and to which the first relay server is able to forward a packet, the second routing object address being an address of the second routing object device to which the second relay server located in a second LAN is able to forward a packet;
        a virtual address registration information storage arranged to store an address that is registered as a virtual address and that does not overlap in the first LAN, the virtual address being included in the gateway table, and the first relay server is set as the gateway of a packet whose destination is the virtual address;
        a virtual address assignment information storage arranged to store a relationship of assignment of the virtual address to the second routing object address; and
        a controller configured and programmed to perform control to:
            transmit the first routing object address to the second relay server and receive the second routing object address from the second relay server, and establish a routing session between the first relay server and the second relay server;
            assign the virtual address to the second routing object address and store the relationship of the assignment into the virtual address assignment information storage;
            upon receipt of a packet whose destination is the first routing object address from the routing session, refer to the virtual address assignment information storage and convert a source address of the packet into the virtual address assigned to the second routing object address, and forward the packet to the first routing object device that is the destination; and
            upon receipt of a packet whose destination is the virtual address from the first routing object device, refer to the virtual address assignment information storage and convert a destination address of the packet into the second routing object address having the virtual address assigned thereto, and forward the packet to the routing session.

* * * * *